(12) United States Patent
Sand

(10) Patent No.: US 6,512,746 B1
(45) Date of Patent: Jan. 28, 2003

(54) METHOD AND APPARATUS FOR MEASURING VOICE GRADE OF SERVICE IN AN IP NETWORK

(75) Inventor: Israel Elchonin Sand, Woodlawn (CA)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 09/151,448

(22) Filed: Sep. 11, 1998

(51) Int. Cl.[7] .............................................. H04L 12/26
(52) U.S. Cl. ........................................................ 370/252
(58) Field of Search ................................. 370/229, 230, 370/230.1, 231, 232, 235, 236, 395.2, 395.21, 395.52, 241, 250, 252, 253, 352, 353, 354, 355, 356

(56) References Cited

U.S. PATENT DOCUMENTS

| | | | | |
|---|---|---|---|---|
| 5,596,364 A | | 1/1997 | Wolf et al. ................... | 348/192 |
| 5,768,527 A | * | 6/1998 | Zhu et al. ..................... | 709/231 |
| 6,046,979 A | * | 4/2000 | Bauman ....................... | 370/229 |
| 6,075,796 A | * | 6/2000 | Katseff et al. ............... | 370/466 |
| 6,304,567 B1 | * | 10/2001 | Rosenberg ................... | 370/356 |

* cited by examiner

Primary Examiner—Kwang Bin Yao
(74) Attorney, Agent, or Firm—Max R. Wood; Ogilvy Renault (57) ABSTRACT

A method for use of IN-service Non-intrusive measuring Device (INMD) for proving Service Level Agreements (SLAs) and pro-active maintenance in IP telephony networks is described. The INMD is currently used only in connection oriented TDM telephony networks and therefore cannot be used directly in the connectionless-featured IP telephony networks. The method for use of INMD to measure voice transmission quality in IP telephony networks include a set of pre-processes for processing IP voice datagrams, and converting the pre-processed datagrams to a format suitable for INMD before the INMD evaluates data in the datagrams for voice GOS. Various tests and co-processes are also used to determine network performance parameters. An IP telephony measurement apparatus for practicing the method is also described. A method for calibrating the device and algorithms is also provided to ensure a high level of confidence in the measurement accuracy.

42 Claims, 5 Drawing Sheets

METHOD AND APPARATUS FOR MEASURING VOICE GRADE OF SERVICE IN AN IP NETWORK

TECHNICAL FIELD

The invention relates generally to Internet Protocol (IP) telephony and, in particular, to measurements of voice grade of service (GOS) for voice over IP (VoIP) in IP networks.

BACKGROUND OF THE INVENTION

The technology for providing public and private voice service via the Internet is rapidly maturing. At present, this technology comprises IP voice gateways and/or IP telephony enabled terminals connected over legacy IP networks. Quality of service (QOS) enabled IP networks for real-time services are expected to be deployed in the near future. This advance in IP technology will effectively result in opening the telephony markets to Internet service providers (ISPs), and the like. Consequently, regulatory agencies will undoubtedly require that Service Level Agreements (SLAs) with customers be proven.

At the present time, the telecom industry uses In-service Non-intrusive Measuring Devices (INMD or NIM) for proving SLAs and for pro-active maintenance of their voice networks, both access and transmission facilities. ANSI standard T.221, Operations, Administration, Maintenance and Provisioning (OAMP) In-service Non-intrusive Measurement Device (INMD) voice service measurements are used in connection oriented TDM networks for this purpose. The ANSI standard specifies interface, measurement range and accuracy requirements for measuring voice-grade transmission parameters. The standard also describes optional functions associated with these parameters, and measurement algorithms that have been verified to meet the accuracy requirements of the standard for the measurement of speech level noise, echo path delay and information loss. Apparatus that embody this standard are commonly identified as INMD devices. The use of INMD measurement results for predicting customer opinion performance (%GOB), which is also called grade of service (GOS), is specified in a document of Alliance Telecommunications Industry Solutions (ATIS), which is a draft proposed standard T1 LB 566 "in-service non-intrusive measurement device (INMD) methodology for applying INMD parameters to grade of service models".

In order to compete with incumbent long distance telephone carriers for market share, VOIP providers will require some mechanism to prove voice quality and network performance. There therefore exists a need for a method and apparatus for measuring voice grade of service in an IP network. No such apparatus is currently known to be available, however, and known INMD devices cannot be used to measure VOIP quality for several reasons. First, the surveillance interface points specified by the INMD standards are particular and hence restricted to connection oriented time division multiplexed (TDM) networks. It is desirable to exploit the connectionless nature of an IP telephony network to provide flexibility in locating the surveillance apparatus. Second, the need for the method and apparatus for measuring voice grade of service in an IP network also arises from the difference in performance and parameters between connection and connectionless networks. In that regard, the required method should include measuring and correlating of IP network performance parameters such as packet loss, delay and delay variation to voice grade performance and result in a set of parameters that are both measurable and meaningful for both an end user and a service provider.

At the present time, there are no IP telephony standards regarding apparatus and network performance. Until the IP telephony industry matures to require apparatus and network performance guidelines and standards, the performance of IP telephony will be highly dependent upon the implementation of voice gateways and IP network performance. Therefore, meaningful and accurate measurement of voice GOS must take into account the performance impact of the IP telephony apparatus and the IP network. In this regard, there exists a need for a method of calibrating an IP telephony apparatus and carrier network to an initial "good state", before it is commissioned for telephone service offering.

SUMMARY OF THE INVENTION

An object of the invention is to provide a non-intrusive measuring method and apparatus to assess an end-to-end IP telephony network transmission quality.

Another object of the invention is to provide a method and apparatus which make use of an In-service Non-intrusive Measurement Device (INMD) adapted for a connection oriented Time Division Multiplexer (TDM) in an IP telephony network for measurement of IP telephony transmission quality.

Yet another object of the invention is provide a method and apparatus for measuring a voice Grade of Service (GOS) and relating IP telephony network performance to the voice GOS to prove a Service Level Agreement (SLA), and for use in network maintenance.

A further object of the invention is to provide a method for calibration of the apparatus and measurement algorithms associated therewith.

In accordance with one aspect of the invention, a method for using In-service Non-intrusive Measuring Devices (INMD) for assessment of transmission quality in Internet Protocol (IP) telephony networks comprising steps:

1) collecting a group of IP datagrams of a speech sample of an end-to-end IP telephony connection from at least one IP interface point by identifying a packet flow associated with an IP telephony session;
2) processing the IP datagrams and converting the same into a format suitable for INMD process;
3) using the INMD process to assess a plurality of voice grade performance parameters related to the telephony session.

Preferably, the assessment of the voice grade performance includes computing a voice Grade Of Service (GOS) performance using a method specified in ATSI T1 LB 566.

The method preferably further comprises a step:

4) calculating a percent Good or Better (%GOB) score relevant to the voice GOS performance.

The method may further comprise a step of:

5) correlating the voice GOS performance to the IP network performance.

Preferably, the method in step 1 further comprises using header information in the IP datagrams to smooth out any delay variation in the speech sample and computing a group of network performance parameters based on the IP datagram header information.

In a preferred embodiment, step 2 further comprises determining a speech compression algorithm used in the IP datagrams by examining data encapsulated in the packets. The IP datagrams of the speech sample may be collected respectively at a far end IP interface point and a near end IP interface point.

In accordance with another aspect of the invention, an apparatus for assessment of IP telephony networks transmission quality comprises:

an In-service Non-intrusive Measurement Device (INMD) adapted to assess voice grade performance parameters in a connection oriented Time Division Multiplexer (TDM);

a processor adapted to convert a group of IP datagrams associated with an end-to-end IP telephony connection to a data format suitable for input to the INMD; and a connection to the INMD for transferring the IP datagrams to the INMD for assessment of the voice grade performance parameters.

The apparatus preferably further comprises a data collector to collect the IP datagrams by identifying a packet flow associated with an IP telephony session.

The INMD preferably includes a function of computing a voice Grade Of Service (GOS) performance specified in ATSI T1 LB 566. Preferably, the apparatus may be selectively co-located with a Personal Computer (PC) based IP voice gateway or stand-alone in the end-to-end IP telephony connection. Also the apparatus preferably comprises a processor to correlate the voice GOS performance to IP network performance. The processor preferably comprises a Digital Signal Processor (DSP) to facilitate the computation.

In accordance with a third aspect of the invention, an initial calibration process for calibrating an IP telephony measurement apparatus comprising the steps of:

1) creating an IP datagram calibration file using speech samples having a known GOS;

2) processing IP datagrams from the IP datagram calibration file using the IP telephony measurement apparatus to convert the IP datagrams into data in a format suitable for INMD processing;

processing the data using INMD functionality of the IP telephony measurement apparatus to determine a GOS value associated with the IP datagrams;

comparing the GOS value with a GOS associated with the speech samples used to create the IP datagram calibration file; and adjusting the IP telephony measurement apparatus until the GOS values are equal, within a certain predefined limit.

Preferably, the calibration IP datagrams are created from an IP telephony terminal during a calibration operation with a speech sample of known GOS and the output is a resultant GOS value. The comparison therefore may be conducted between the resultant GOS value and the known GOS of the speech sample.

This invention permits the IP telephony industry to measure a quality of the service they offer to their clients. Such a capability will provide not only a measure of voice GOS, but also a method of relating IP network performance to voice SLAs, which provides Internet Service Providers (ISPs) and Internet backbone network providers with guidelines for relating voice performance to network parameters that are both measurable and meaningful.

The invention exploits the connectionless nature of an IP telephony network in that the apparatus can be co-located in a voice gateway or deployed as a stand-alone apparatus, remote from a central location. The stand-alone apparatus would be required in an all-IP network scenario. Additionally, the invention takes advantages of the fact that most of the processes of the invention are already provided by voice gateways and any additional processes can be provided through software.

BRIEF DESCRIPTION OF THE DRAWINGS

The invention will now be further explained by way of example only and with reference to the following drawings, in which.

DETAILED DESCRIPTION OF THE PREFERRED EMBODIMENT

The invention uses ANSI standard T1.221 OAM&P INMD Voice Service Measurements and Alliance Telecommunication Industry Solutions (ATIS) draft proposed standard T1 LB 566 "INMD Methodology for Applying INMD Parameters to Grade of Service Models", to provide a method and an apparatus for measuring the quality of voice transmissions over IP networks and to predict customer opinions of performance.

Figure 1:
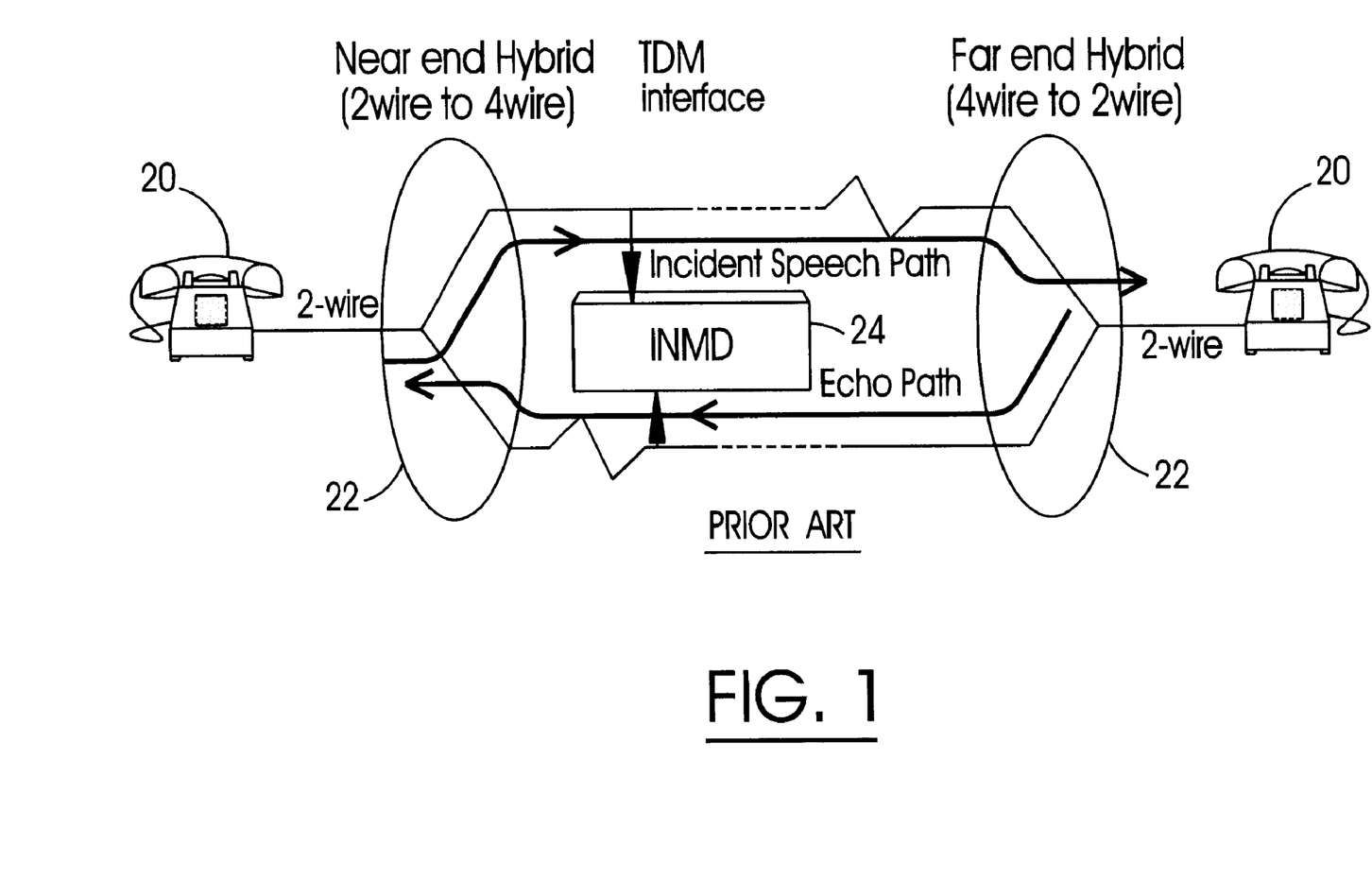
FIG. 1 is a block diagram of an ANSI T1.221 INMD for voice telephony known in the prior art.

FIG. 1 shows the type of interface (measurement access points) specified in the ANSI and ATIS standards, including wire analogue interfaces 20 for baseband voice and data transport interfaces 22 specified in International Telecommunications Union (ITU) recommendation M.3010 which covers interfaces including T1 and E1. The incident speech path and echo path are illustrated as well. The INMD can also be configured to detect call progress states via a Signalling System 7 (SS7) which is not shown. The technology of using INMD 24 illustrated in FIG. 1 is well known in the field of connection oriented TDM telecommunications. That methodology is adapted to the field of IP telephony networks to provide a method and apparatus in accordance with the invention.

Figure 2:
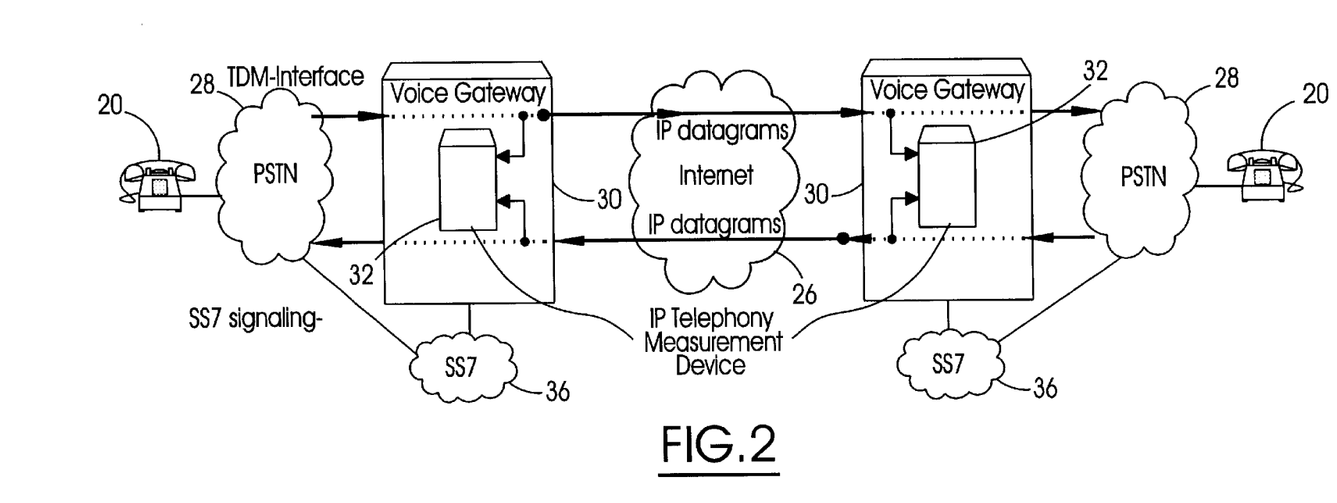
FIG. 2 is a block diagram of an embodiment of the invention showing measurement apparatus for an IP telephony network which are co-located in voice gateways.

FIG. 2 shows two IP telephony measurement apparatus 32 which embody the ANSI T1.221 standard. The apparatus 32 are interfaced into an IP telephony network. In this embodiment, a far-end and a near-end public switched telephone network (PSTN) respectively interface into the IP network 26 through voice gateways 30. The IP telephony measurement apparatus 32 are incorporated in each of the voice gateways. The apparatus 32 comprises software processes that are executed as "batch programs" and may also use hardware such as a Digital Signal Processor (DSP) to facilitate computation. At each end, the Signalling System 7 (SS7) signalling network 36 also interfaces with the voice gateway 30 and PSTN 28 to permit detection of call progress states.

Figure 3:
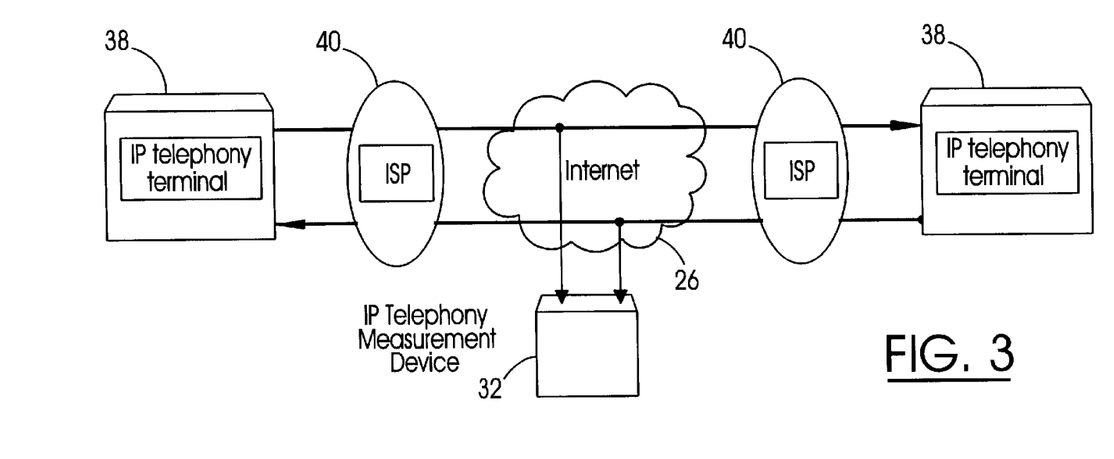
FIG. 3 is a block diagram of another embodiment of the invention, showing a measurement apparatus for an all-IP telephony network which is a stand-alone device.

Another embodiment of the IP telephony measurement apparatus 32 is a stand-alone configuration illustrated in FIG. 3. The IP telephony measurement apparatus 32 is interfaced in an "all IP" telephony connection. An IP telephony terminal device 38 at each end interfaces directly with the Internet 34 via ISPs 40 instead of voice gateways 30. The most common IP telephony enabled terminal devices 38 are personal computers with related IP telephony software and hardware. Consideration for a location of the IP telephony measurement apparatus 32 is the access to IP datagrams for a circuit to be monitored. It can be located at any point in the IP network where the IP datagrams are reliably collected.

The IP telephony measurement apparatus 32 in the embodiments described above generally comprises the INMD 24 and software for pre-processing the IP datagrams collected from the IP telephony network and converting the datagrams into a format suitable for processing by the INMD 24. The format is specified by ANSI T1.221 for INMD processing in regard to instantaneous speech amplitude in volts. A Digital Signal Processor may also be included to facilitate the processing. The INMD in the IP telephony measurement apparatus 32 then processes the converted datagrams as it does in a connection oriented TDM telephony network to compute the GOS and other related network performance parameters.

Figure 4:
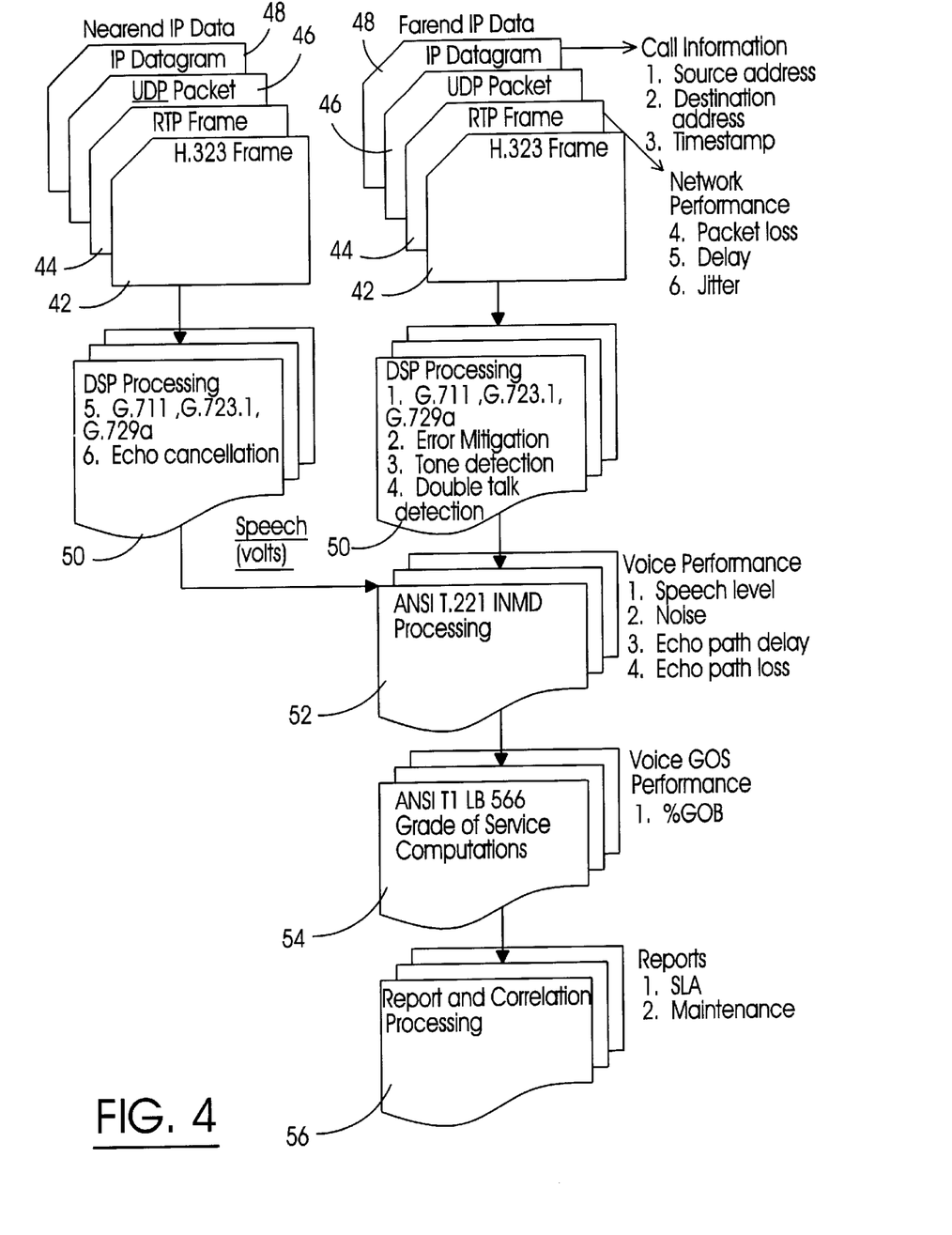
FIG. 4 is a flow diagram of processes performed by the apparatus shown in FIG. 3 and FIG. 4.

IP telephony measurement apparatus 32 performs a plurality of processing functions illustrated in FIG. 4. First, the IP telephony measurement apparatus performs a DSP processing function 50 in which a Digital Signal Processor (DSP) may be used to facilitate the processing of IP voice datagrams. The IP voice datagrams include packet header information such as source address, destination address and timestamp, and network performance information such as packet loss, delay and jitter can be derived using the packet header information. The protocol types of the IP voice datagrams are generally an H.323 frame 42 encapsulated in Real-time Transport Protocol (RTP) frame 44 encapsulated in User Datagram Protocol (UDP) packet 46 encapsulated in IP datagram 48. The DSP processing will be described below in detail with reference to a method associated with the IP telephony measurement apparatus 32 for measuring voice GOS in the IP network. The DSP processing function converts the processed data into the format specified for INMD processing. The IP telephony measurement apparatus 32 also includes an ANSI T1.221 INMD processing function 52 to process the converted data and to output voice performance data. The IP telephony measurement apparatus 32 further includes an ATSI T1 LB 566 processing function 54 to compute voice GOS performance from the voice performance data processed by the INMD, and a report and correlation processing function 56 to prove an SLA and provide data for maintenance.

A method for measuring voice GOS associated with the IP telephony measurement apparatus 32 comprises the following steps:

1. At the far-end IP interface point, the Internet protocol (IP) voice datagrams of a particular end-to-end IP telephony connection are collected by recognizing the flow and protocol types. As noted above, the most common protocol stack being an H.323 frame 42 encapsulated in Real-time Transport Protocol (RTP) frame 44 encapsulated in User Datagram Protocol (UDP) packet 46 encapsulated in IP datagram 48;

2. At the far-end IP interface point, storing IP source and destination address information and a timestamp for post correlation analysis;

3. At the far-end IP interface point, using the RTP frame 44 header information including sequence number and timestamp to smooth out delay variation in the speech samples, which delay variation (jitter) is incurred in routing and switching apparatus during transfer through the IP network;

4. At the far-end IP interface point, collecting parameters related to network performance in terms of delay, packet-loss and jitter relevant to a particular end-to-end IP telephony connection, the parameters computed being based on the sequence number, timestamp and length information included in the RTP header information;

5. At the far-end IP interface point storing the timestamp for post correlation analysis;

6. At the far-end IP interface point determining a speech compression algorithm used to create the voice data, by taking the H.323 frame 42 encapsulated data and processing the data in the DSP 50, the most common speech compression algorithms being G.711, G.723.1 and G.729A;

7. Taking the smoothed-out compressed speech data and converting it to a format specified for INMD processing;

8. At the near-end interface point, repeating steps 1 through 7;

9. Computing, by INMD from the data prepared in steps 7 and 8, voice grade performance parameters including speech level, noise, echo and echo path delay, the far-end parameters being used to compute speech level and noise, while the near-end data being used to compute echo path delay and loss;

10. Calculating, guided by ATSI T1 LB 566, percentage good or better (%GOB) scores related to voice GOS from results of step 9;

11. Reporting the result from step 10 for SLA and Maintenance or for input of Correlation Processing.

Co-processes may be involved in step 7 of the above process, depending on the IP telephony processes that need to be taken into account. The most common of the co-processes is error mitigation to remove the effects of error and packet loss. Another process is insertion of background noise during silent periods.

Co-processes may also be involved in step 9, depending on the IP telephony connection. The most common of the co-processes in this step are active speech detection, tone detection, double-talk detection and echo cancellation.

It is both necessary and difficult to account for differences in implementations of IP telephony voice gateways and IP telephony enabled terminals, as related to the measurement accuracy of voice grade performance. Some of the main implementation differences relate to reducing path delay, poor network performance, mitigation techniques and echo cancellation. All these factors should be accounted for and are addressed by a method described below. The method is generally based on a performance factor that relates a difference in performance between the measurement apparatus being calibrated and a calibration standard.

Figure 5:
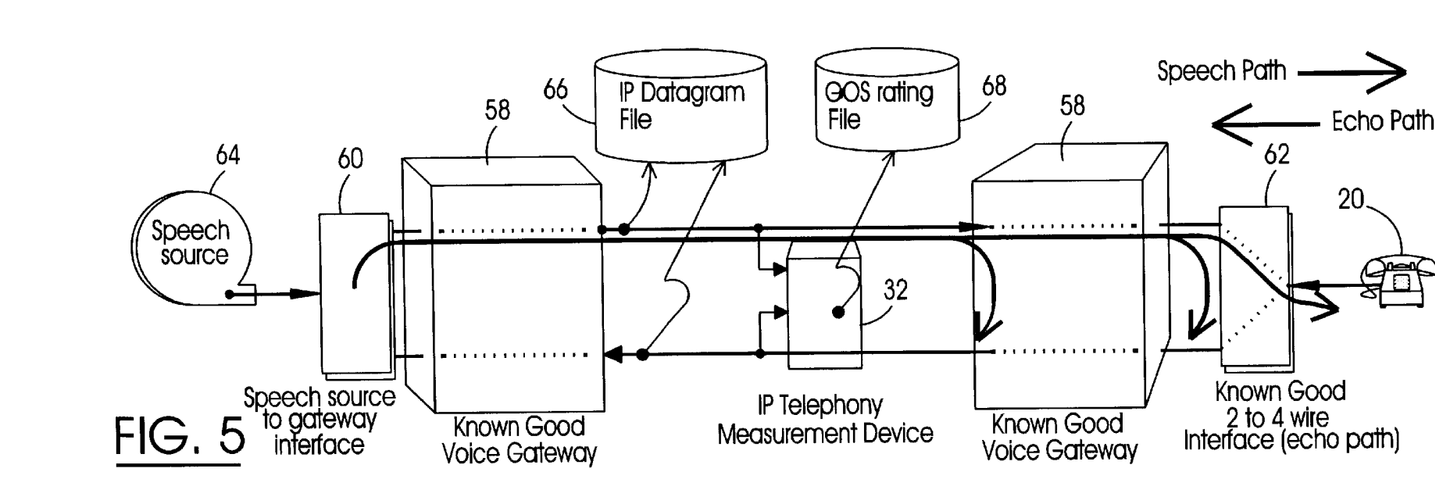
FIG. 5 is a block diagram of a configuration for calibration of the apparatus shown in FIGS. 3 and 4.

The measurement apparatus and algorithms for measuring voice analogue parameters require calibration. FIG. 5 shows a calibration configuration which uses a voice IP network set-up. The measurement apparatus 32 interfaces with the end-to-end known good voice network between two known good voice gateways 58 at the respective ends. The speech-source-to-gateway interface 60, voice analogue interface 20 and two-to-four wire interface 62 all are known to be in good condition. The method of calibration involves measuring GOS ratings with the IP telephony measurement apparatus 32 using a voice IP network set-up known to produce good results. Various tests exercise the complete range of speech quality parameters, such as speech level, echo path, noise, etc. as per ANSI T1.221 standard. Before calibration begins, an IP datagram calibration file is produced using a known good IP telephony terminal apparatus. The IP datagram calibration file consists of IP datagrams output by the IP telephony terminal apparatus using an input speech source 64 of a known GOS. The speech source 64 is the recommended speech samples specified by the ANSI standard. The IP datagram calibration file is used as an input to calibrate the IP telephony measurement apparatus 32. The test cases are also specified by the ANSI standard. During the calibration process, the GOS values are stored in a GOS rating file 68. When the resultant GOS values match GOS values associated with the recommended speech samples within limits specified by the ANSI standard, the calibration is within acceptable limits of accuracy.

Figure 6:
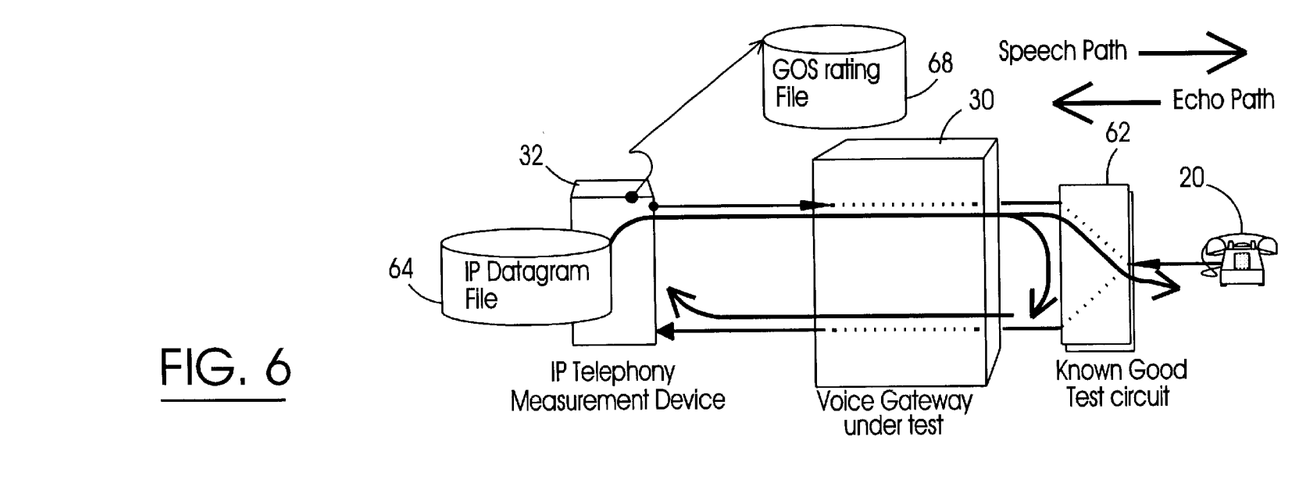
FIG. 6 is a block diagram of a configuration for calibration of a voice gateway to determine the performance factor.

FIG. 6 illustrates one embodiment of a configuration for verifying a voice gateway. After the IP telephony measurement apparatus 32 is calibrated in the above known good IP network set-up, the IP telephony measurement apparatus 32 may be used, in conjunction with the IP datagram calibration file created during the initial phase of the calibration process described above to verify other voice gateways 30. Persons skilled in the art will understand that the principle of the calibration is the same as the calibration of the IP telephony measurement apparatus 32 described above, even though the apparatus tested is a voice gateway 30.

The method for calibrating the IP telephony measurement apparatus 32 and algorithms for measuring voice analogue parameters comprises a process which includes the following steps:

1. Creating an IP datagram calibration file including IP datagrams from an IP telephony terminal apparatus created during a calibration operation with speech samples of a known GOS;

2. Inputting the IP datagrams of the IP datagram calibration file through step 1 through step 10 of the method for measuring voice GOS described above;

3. Comparing the value of the voice GOS resulting from the previous step with the GOS value for initial speech stored in the IP datagram calibration file and determining that the IP telephony measuring device 32 is accurate if the two GOS values match within limits for accuracy specified by ANSI T1.221.

The calibration process may also be used for commissioning an IP telephony network and related apparatus as reliable. The method is similar to the process described above. The calibration source used (either speech or IP datagram file) depends on the network under calibration. The result of the calibration process is a performance-factor describing the degree of similarity for GOS between the network being calibrated and the GOS of the input speech sample.

In regard to the method for correlating voice GOS to network performance, the method includes the following steps:

1. Tabulating all the performance particulars for measuring end-to-end voice connections as determined by source/destination address pairs. The particular parameters are analogue voice performance, voice GOS and IP network performance such as packet loss, delay and jitter;

2. Using the tabulated data to look for correlations between network performance parameters and analogue voice parameters. The purpose of which is to verify SALs and for maintenance purposes.

Figure 7:
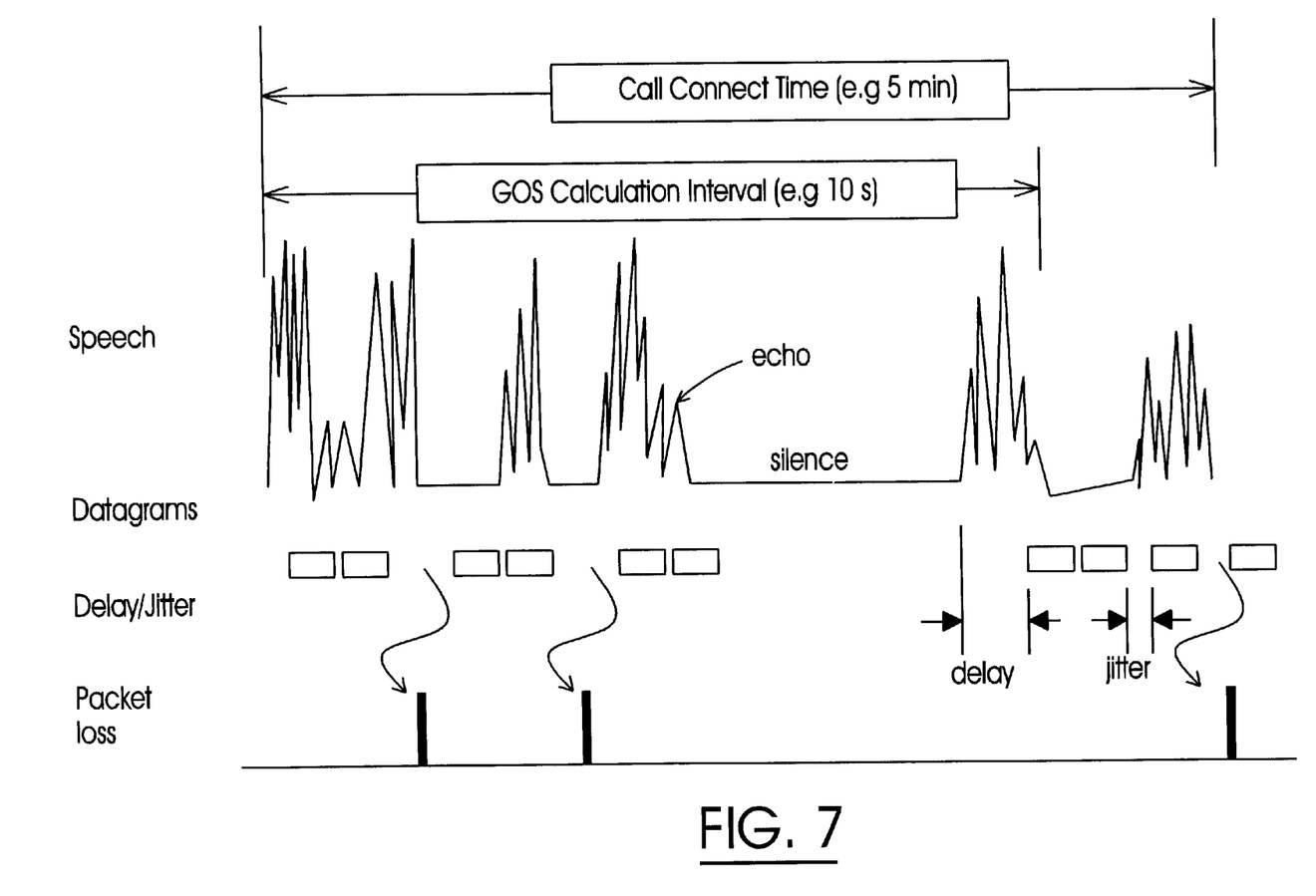
FIG. 7 is a graph illustrating a concept of relating network performance to GOS.

FIG. 7 illustrates an example of this process. The graph shows speech bursts and silent periods for a typical call of five minutes in duration. The GOS rating is calculated over a contiguous period of speech. The speech must conform to the rules of ANSI T1.221 which screen out invalid speech bursts, such as double talk and tones. In the example shown, a period of ten seconds of speech is used for GOS calculations. The graph also shows how packet loss, delay and jitter may occur during call duration. The correlation between the GOS rating for a call and network performance is logged. A significant number of calls are measured using this procedure to gain a high confidence in the relationship between GOS rating and network performance.

Since the voice GOS is an end-to-end measurement, certain filtering for the effects of the access portion of the voice IP connection, with regard to performance, are required. For example, calls should be grouped into specific sets determined by calling numbers which are known to be served by the same PSTN network equipment in order to ensure accurate GOS measurements.

The embodiments of the invention described above are exemplary only. Changes and modifications to those embodiments may become apparent to persons skilled in the art. The scope of the invention is therefore intended to be limited solely by the scope of the appended claims.

I claim:

1. A method for using In-service Non-intrusive Measuring Devices (INMD) for assessment of transmission quality in Internet Protocol (IP) telephony networks comprising the steps of:
   1) collecting a group of IP datagrams associated with a speech sample of an end-to-end IP telephony session from at least one IP interface point by identifying a packet flow associated with the IP telephony session;
   2) processing the IP datagrams and converting the datagrams into a format suitable for INMD processing;
   3) using an INMD process to assess a plurality of voice grade performance parameters related to the IP telephony session.

2. A method as claimed in claim 1 wherein the step of using the INMD process to assess the voice grade performance includes a step of computing a voice Grad Of Service (GOS) performance using a method specified in ATSI T1 LB 566.

3. A method as claimed in claim 2 further comprising a step of:
   4) calculating a percent Good or Better (%GOB) score relevant to the voice GOS performance.

4. A method as claimed in claim 3 further comprising a step of:
   5) correlating the voice GOS performance to performance of the IP telephony network.

5. A method as claimed in claim 1 wherein the IP datagrams collected in step 1 comprise H.323 frames encapsulated in Realtime Transport Protocol (RTP), encapsulated in User Datagram Protocol (UDP), encapsulated in the IP datagram.

6. A method as claimed in claim 1 wherein step 1 further comprises a step of smoothing out any delay variation in the speech sample using header information in the IP datagrams.

7. A method as claimed in claim 1 wherein step 1 further comprises a step of computing a group of network performance parameters using header information in the IP datagrams.

8. A method as claimed in claim 1 wherein step 2 further comprises a step of determining a speech compression algorithm used in the IP datagrams by examining data encapsulated in the packets.

9. A method as claimed in claim 1 wherein the step of collecting the IP datagrams of the speech sample is performed respectively at a far end IP interface point and a near end IP interface point.

10. A method as claimed in claim 9 wherein the step of using the INMD to assess the converted IP datagrams collected from the far end IP interface point further comprises a step of computing voice grade performance parameters related to speech level and noise, and the step of using the INMD to access the converted IP datagrams collected from the near end IP interface point further comprises a step of computing voice grade performance parameters relating to echo path delay and loss.

11. A method as claimed in claim 4 wherein step 5 further comprises:
tabulating a plurality of performance data for the measured end-to-end IP telephony connection as identified by a pair of source/destination addresses, the data including analogue voice parameters, the voice GOS and the IP network performance; and
correlating the network performance and the analogue voice parameters using the tabulated data to verify a Service Level Agreement (SLA), and for use in network maintenance.

12. A method as claimed in claim 1 wherein step 1 further comprises a step of storing IP source and destination address information associated with each IP datagram, and further comprises storing a datagram timestamp used for a post correlation analysis.

13. A method as claimed in claim 7 further comprising a step of storing a timestamp for post correlation analysis.

14. A method as claimed in claim 7 wherein the step of computing network performance parameters comprises computing delay, packet loss and delay variation using the header information, which includes a sequence number, timestamp and length information.

15. A method as claimed in claim 1 wherein step 2 further comprises a step of using an error mitigation process to remove an effect of errors and packet loss.

16. A method as claimed in claim 1 wherein step 2 further comprises a step of inserting background noise during a silent period in the end-to-end IP telephony session.

17. A method as claimed in claim 1 wherein step 3 further comprises a step of performing a process to active speech detection.

18. A method as claimed in claim 1 wherein step 3 further comprises a step of performing a co-process for tones.

19. A method as claimed in claim 1 wherein step 3 further comprises a step of performing a process for double talk detection.

20. A method as claimed in claim 1 wherein step 3 further comprises a step of performing a co-process for echo cancellation.

21. A method as claimed in claim 1 wherein step 2 comprises a step of operating a Digital Signal Processor (DSP) to process the IP datagrams.

22. A method as claimed in claim 6 wherein the step of smoothing out any delay variation comprises a step of using header information associated with the RTP protocol header.

23. A method as claimed in claim 7 wherein the step of smoothing out any delay variation comprises a step of using header information associated with the RTP protocol header.

24. An initial calibration process for calibrating an IP telephony measurement apparatus comprising the steps of:
creating an IP datagram calibration file using speech samples having a known GOS;
processing IP datagrams from the IP datagram calibration file using the IP telephony measurement apparatus to convert the IP datagrams into data in a format suitable for INMD processing;
processing the data using INMD functionality of the IP telephony measurement apparatus to determine a GOS value associated with the IP datagrams;
comparing tie GOS value with a GOS associated with the speech samples used to create the IP datagram calibration file, and
adjusting the IP telephony measurement apparatus until the GOS values are equal, within a certain predefined limit.

25. A method as claimed in claim 24 wherein the step of creating the IP datagrams comprises a step of creating the IP datagrams using an IP telephony terminal which is known to be good.

26. A method as claimed in claim 25 further comprising a step of using the IP telephony measurement apparatus in conjunction with a known speech sample having a known GOS and a related IP datagram file to calibrate both a far end and near end gateways when the IP telephony measurement apparatus is determined good.

27. A method as claimed in claim 26 further comprising a step of sending the IP datagram file to the far end gateway and looping the datagram file back using a four-wire analogue interface to return the datagram file to the measurement apparatus.

28. An apparatus for assessment of IP telephony networks transmission quality comprising:
an In-service Non-intrusive Measurement Device (INMD) processing function adapted to assess voice grade performance parameters in a connection oriented Time Division Multiplexer (TDM); and
a processor adapted to convert a group of IP datagrams associated with an end-to-end IP telephony connection to data in a data format suitable for input to the INMD processing function for assessment of the voice grade performance parameters.

29. An apparatus as claimed in claim 28 further comprising a data collector adapted to collect the IP datagrams by identifying a packet flow associated with an IF telephony session.

30. An apparatus as claimed in claim 28 wherein the INMD processing function further comprises a function for computing a voice Grade Of Service (GOS) performance specified in ATSI T1 LB 566.

31. An apparatus as claimed in claim 28 wherein the apparatus is co-located with an IP voice gateway.

32. An apparatus as claimed in claim 28 wherein the apparatus is a stand-alone device in the end-to-end IP telephony connection.

33. An apparatus as claimed in claim 30 further comprising a processor adapted to correlate the voice GOS performance to IP network performance.

34. An apparatus as claimed in claim 30 wherein the converting processor is adapted to use header information in the IP datagrams to smooth out any delay variation in a speech sample and further adapted to compute a group of network performance parameters.

35. An apparatus as claimed in claim 34 wherein the converting processor further comprises a Digital Signal Processor (DSP) to facilitate computations.

36. An apparatus as claimed in claim 28 wherein the connection is linked to a far end IP interface point and a near end IP interface point of the IP telephony session.

37. An apparatus as claimed in claim 36 wherein the INMD processing function is adapted to compute voice grade performance parameters relating to speech level and noise from the converted IP datagrams collected from the far end IP interface point and further adapted to compute voice grade performance parameters relating to echo path delay and loss from the converted IP datagrams collected from the near end IP interface point.

38. An apparatus as claimed in claim 30 wherein the INMD processing function further comprises a function adapted to calculate a percent Good Or Better (%GOB) score relevant to the voice GOS performance.

39. An apparatus as claimed in claim 34 wherein the correlating processor is adapted to tabulate a plurality of performance data for the assessed end-to-end IP telephony connection as identified by a pair of source/destination addresses, the data including analogue voice parameters, the voice GOS and the IP network performance; and is further adapted to correlate the network performance and the analogue voice parameters using the tabulated data to verify a Service Level Agreement (SLA) and for use in network maintenance.

40. An apparatus as claimed in claim 34 wherein the converting processor is adapted to compute delay, packet loss and delay variation using header information that includes a sequence number, timestamp and packet length information.

41. An apparatus as claimed in claim 28 wherein the converting processor is adapted to conduct an error mitigation process to remove an effect of errors and packet loss.

42. An apparatus as claimed in claim 28 wherein the converting processor is further adapted to conduct a process for an insertion of background noise during a silent period during the end-to-end IP telephony connection.

* * * * *